United States Patent [19]
Miller

[11] Patent Number: 5,964,494
[45] Date of Patent: Oct. 12, 1999

[54] SLIDE-OUT VISOR

[75] Inventor: Dean T. Miller, Wyoming, Mich.

[73] Assignee: Lear Donnelly Overhead Systems, L.L.C., Southfield, Mich.

[21] Appl. No.: 09/246,624

[22] Filed: Feb. 8, 1999

Related U.S. Application Data

[60] Provisional application No. 60/075,568, Feb. 23, 1998.
[51] Int. Cl.⁶ ...................................................... B60J 3/02
[52] U.S. Cl. .......................................... 296/97.1; 296/97.2
[58] Field of Search ................................... 296/97.1, 97.8, 296/97.9, 97.11, 97.12, 97.13, 97.2

[56] References Cited

U.S. PATENT DOCUMENTS

| 5,316,361 | 5/1994 | Miller | 296/97.8 |
| 5,490,708 | 2/1996 | Lee | 296/97.8 |

FOREIGN PATENT DOCUMENTS

| 331779 | 9/1989 | European Pat. Off. | 296/97.1 |
| 1281064 | 11/1961 | France | 296/97.1 |
| 3346976 | 7/1985 | Germany | 296/97.9 |
| 4023243 | 11/1991 | Germany | 296/97.1 |

*Primary Examiner*—D. Glenn Dayoan
*Assistant Examiner*—Paul Chenevert
*Attorney, Agent, or Firm*—Brooks & Kushman P.C.

[57] ABSTRACT

A vehicle sun visor according to the invention includes a frame defining an open-top channel and a track assembly mounted to the frame in the channel. The track assembly includes a planar central portion and depending parallel sidewalls. Each track sidewall is hinged to the central portion for hinged articulation of the sidewalls relative the central portion prior to assembly within the frame. Further, each track sidewall has at least one inwardly directed flange forming at least one track. An extender blade is mounted in the at least one track for sliding movement from a retracted position substantially within the track assembly to an extended position wherein the extender blade at least partially extends from the track assembly.

10 Claims, 3 Drawing Sheets

SLIDE-OUT VISOR

CROSS-REFERENCE TO RELATED APPLICATION

This application claims the benefit of U.S. provisional patent application Ser. No. 60/075,568, filed Feb. 23, 1998.

BACKGROUND OF THE INVENTION

1. Field of the Invention

The present invention relates in general to a vehicular sun visor, and more particularly, to a sun visor with a sliding member.

2. Description of the Related Art

Sun visors for vehicles have optional features, such as a vanity compartment or a secondary slide-out visor. There is constant competitive pressure in the automotive industry to reduce cost and complexity. The present invention provides a cost-effective structural configuration and a simplified assembly without limiting optional sliding features such as a door for a vanity compartment and/or a secondary slide-out visor.

SUMMARY OF THE INVENTION

A vehicle sun visor according to the invention includes a frame defining an open-top channel and a track assembly mounted to the frame in the channel. The track assembly includes a planar central portion for hinged articulation of the sidewalls relative the central portion prior to assembly within the frame. Further, each track sidewall has at least one inwardly directed flange forming at least one track. An extender blade is mounted in the at least one track for sliding movement from a retracted position substantially within the track assembly to an extended position wherein the extender blade at least partially extends from the track assembly.

Preferably, a living hinge between each track sidewall and the central planar portion of the track assembly allows for articulation of the sidewalls. Further, it is preferred that the frame includes a pair of frame sidewalls with spaced openings and the track sidewalls have outwardly projecting tabs received in the spaced openings to retain the track assembly in the frame. The tabs include ramped lower surfaces to snap-fit the track assembly to the frame.

In one variation of the visor, a stop between the extender blade and the central portion of the track assembly limits the movement of the extender blade to the extended position. Preferably, the stop is flexible and includes a ramped surface for insertion of the extender blade into the track assembly.

In another variation, each track sidewall includes a pair of inwardly directed flanges forming a pair of tracks, and the extender blade is mounted in one of the tracks. Preferably, the central portion includes an enlarged opening, a mirror is mounted behind the opening, and a door disposed is between the central portion and the mirror, and further being slidably mounted in the other of the tracks.

Preferably, the vehicle sun visor includes a molded body of expanded polyproplene, and the frame is mounted in the molded body. Most preferably, the frame is in-molded in the molded body.

BRIEF DESCRIPTION OF THE DRAWINGS

The invention will now be described with reference to the drawings wherein.

DETAILED DESCRIPTION OF THE PREFERRED EMBODIMENTS

Figure 1:
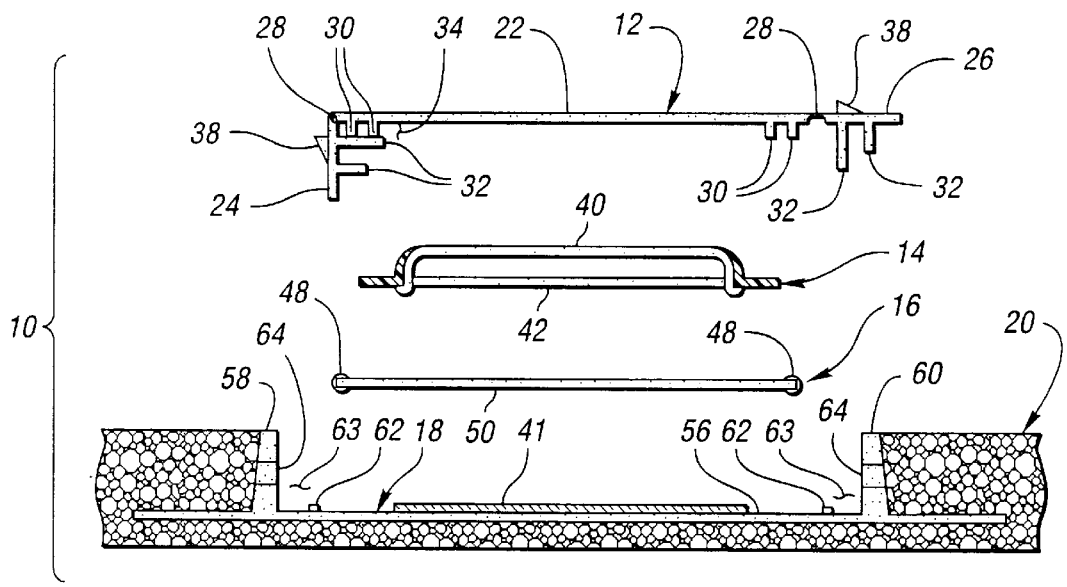
FIG. 1 is an exploded cross-sectional view of a first embodiment of a sun visor in accordance with the present invention, including a vanity assembly and an extender blade.
Figure 2:
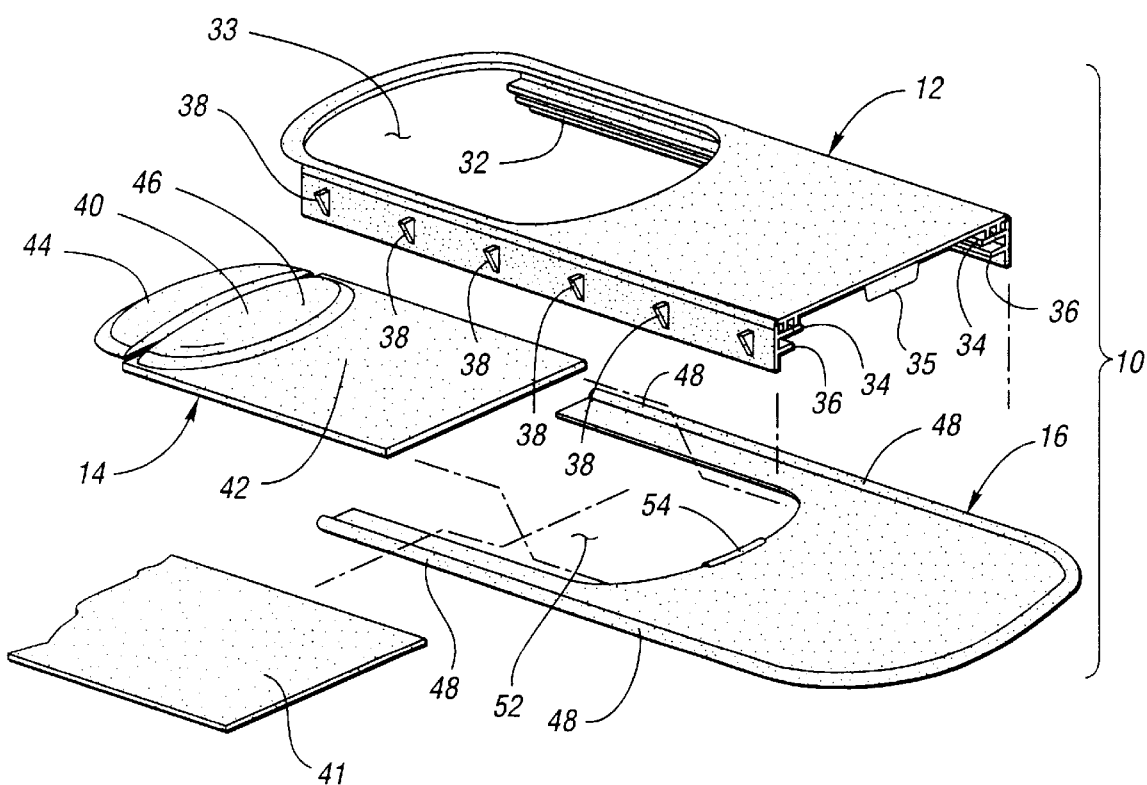
FIG. 2 is a perspective view of a track assembly, an extender blade, and a vanity door assembly of the sun visor of FIG. 1.

Referring now to the drawings and to FIGS. 1 and 2 in particular, a first embodiment of a partially assembled sun visor 10 is shown and comprises a track assembly 12, a vanity door assembly 14, an extender blade 16, a subframe 18, and a main body 20.

The track assembly 12 is shown as partially articulated in FIG. 1 and as fully articulated in FIG. 2 and comprises a planar body 22, a first side wall 24., and a second side wall 26. Both the first and second side walls 24 and 26 extend contiguously from the planar body 22 and each are connected to the planar body by living hinges 28. Upon full articulation, both the first and second side walls 24 and 26 are configured substantially parallel to one another and each extends downwardly from the planar body 22 in a substantially perpendicular orientation. Upon such full articulation an upper channel 34 and a lower channel 36 are defined by parallel base flanges 30 and parallel side wall flanges 32. The parallel base flanges 30 define a stopping point for the rotation of the side walls 24 and 26 as the parallel side wall flanges 32 contact the parallel base flanges 30 and, in turn, define the upper and lower channels 34 and 35, respectively. Both the first side wall 24 and the second side wall 26 include a plurality of outwardly extending tabs 38. Planar body 22 optionally includes an aperture 33, which defines an accommodation area for a vanity assembly. A stop tab 35 extends downwardly from the planar body 22 in a substantially perpendicular orientation.

As shown in FIGS. 1 and 2, the vanity assembly 14 includes a lens 40, a door 42, and a mirror 41. The door 42 is substantially planar and rectangular. The lens 40 extends upwardly from the door 42 and is substantially "dome" shaped. The lens 40 is comprised of a first half shell 44 and a second half shell 46. The door 42 is slidably received within the upper channel 34 of the track assembly 12 for movement between a closed position., where the aperture 33 is covered, and an open position, where the aperture 33 is partially uncovered, providing access to a vanity assembly. The second half shell 46 of the lens 40 can be used as a handle for assisting in sliding the vanity door between the open and closed positions.

As is conventional, the lens 40 houses a lamp (not shown) for illuminating the occupants's face for viewing in the mirror 41. Although not shown, it is contemplated that the lamp be actuated by door position: that is, when the door 42 is opened, the lamp is electrically connected to a power source (not shown) and the mirror is lighted. Futhermore, although the lens 40 has been shown, for illustrative purposes only, as substantially dome shaped, any one of a number of geometric configuration can be used to define the lens 40 determined by the direction and intensity of the illumination that is desired.

The extender blade 16 includes a rounded peripheral rim 48 about a planar body 50. A stop tab 54 extends upwardly from the planar body 50 in a substantially perpendicular orientation. The peripheral rim 48 is slidably received within the lower channel 36 for movement between a retracted position, where the extender 16 is almost completely stored within the body 20 until the track assembly stop 35 abuts the extender stop 54. Thus, the stop tab 54 can cooperate with the stop tab 35 of the track assembly 12 to, in turn, regulate the lateral slidability of the extender blade 16. The planar body 50 optionally includes a cutout 52 for accommodating an associated vanity assembly and so that the planar body 50 does not cover the aperture 30 when the extender is in the retracted position.

Figure 3:
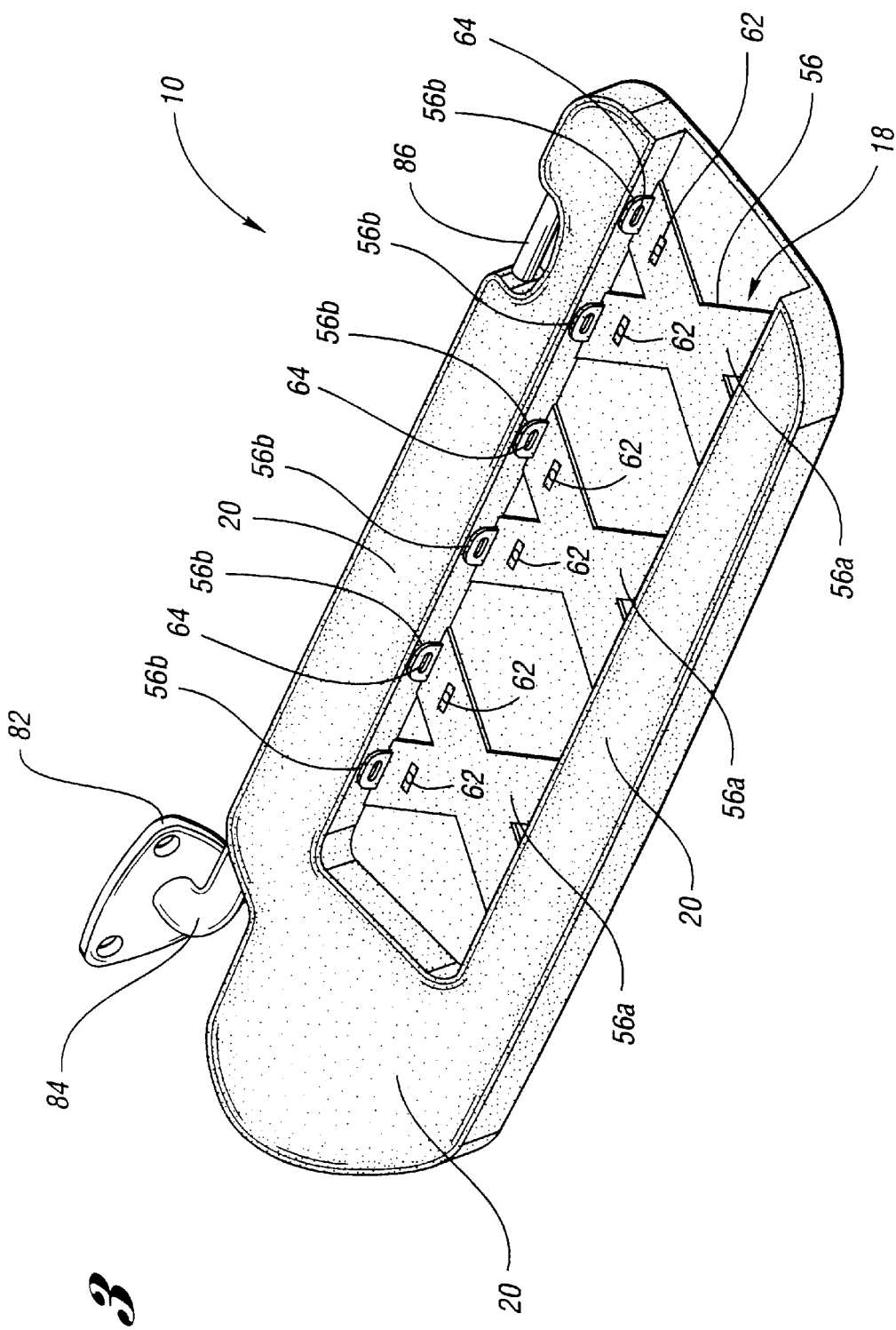
FIG. 3 is a perspective view of a partially assembled sun visor in accordance with the present invention showing, among other things, a visor subframe inserted into a main body.

As shown in FIGS. 1 and 3, the subframe 18 is securably recessed into the main body 12. Together, the subframe 18 and the main body 12 define an open-top channel for receiving the track assembly 12. The subframe 18 comprises a base 56, a first side wall 58, a second side wall 60, a plurality of alignment tabs 62, and a plurality of side wall slots 64. The base 56 is preferably a series of connected and repeating X-shaped members 56*a*. The side walls 58 and 60 are preferably formed from vertically extending tabs 56*b* provided at the ends of the legs of the X-shaped members 56*a*. It is within the scope of the invention for the subframe 18 to comprise a planer base with planer side walls, along with other suitable configurations. However, the X-shaped members 56*a* and 56*b* are preferred because of reduced material requirements.

As shown in FIGS. 1 and 3, the subframe 18 is securably recessed into the main body 12. Together, the subframe 18 and the main body 12 define an open-top channel for receiving the track assembly 12. The subframe 18 comprises a base 56, a first side wall slots 58, a second side wall 60, a plurality of alignment tabs 62, and a plurality of side wall slots 64. The base 56 is preferably a series of connected and repeating X-shaped members 56*a*. The side walls 58 and 60 are preferably formed from vertically extending tabs 56*b* provided at the ends of the legs of the X-shaped members 56*a*. It is within the scope of the invention for the subframe 18 to comprise a planer base with planer side walls, along with other suitable configurations. However, the X-shaped members 56*a* and 56*b* are preferred because of reduced material requirements.

The tabs 56*b* defining the first and second side walls 58 and 60 are configured substantially parallel to one another and each extend upwardly from the base 56 in a substantially perpendicular orientation. The tabs 56*b* of the first and second side walls 58 and 60 include a plurality of slots 64 for controllably receiving the tabs 38 of the inserted track assembly 12. The plurality of alignment tabs 62 extend upwardly from the base 56 in a substantially parallel orientation relative to the tabs 56*b* defining the first and second side walls 58 and 60. The alignment tabs 62 along with the first and second side walls 58 and 60 define a channel 63 for receiving the track assembly 12.

While the subframe 18 is preferably fabricated from polymerized organic compounds, it is likewise contemplated that the subframe 18 can be fabricated from any suitable material. Moreover, although not shown, it is contemplated that the main body 20 can completely cover the subframe 18. The main body 20 is substantially rectangular (as best seen in FIG. 3) and is preferably fabricated from a synthetic resin such as extended polypropylene, however numerous other fabrication materials known to those having ordinary skill in the art likewise contemplated for use. Preferably, main body 20 is molded about the subframe 18. The in-molded subframe 18 provides support and rigidity to the main body 20.

The main body 20 has a mounting rod 84, which is rotatably mounted to a mounting clip 82. The mounting clips mounts to the headliner or roof of a vehicle. A clip rod 86 is provided to fix the outboard end of the visor body in the traditional manner.

Upon assembly of the sun visor 10, the vanity door 42 with the assembled lens 40 is positioned so that the door 42 abuts the planar body 22 and the lens 40 is received within the aperture 33. The first and second side walls 24 and 26 of the track assembly 12 are then rotated about the living hinges 28., until the side wall flanges 32 abut the base flanges 30, capturing the vanity door 42 within the upper channel 34. The side walls 24 and 26 are then inserted into the channels 63, which are defined by both the alignment tabs 62 and their corresponding first and second side walls 58 and 60 of the subframe 18. Upon insertion, the plurality of tabs 38 of first and second side walls 24 and 26 are securably received into the plurality of slots 64 of both the first and second side walls 58 and 60 of the subframe 18. Of course, many other means for securing the track assembly 12 into the subframe 18 are also contemplated. Alternatively, conventional adhesives can likewise be used to secure the track assembly 12 to the subframe 18.

Upon further assembly of the sun visor 10, the extender blade, 16 is placed into the lower channel 36 of the track assembly 12. Inasmuch as the peripheral rim 48 have a vertically peripheral geometry that is greater than or equal to the vertically peripheral geometry of the planar body 50, the planar body 50 does not contact the lower channel 36. Instead peripheral rim 48 contact the channel 36. The extender blade 16 can be slidably extended and/or retracted in accordance with the geometric boundaries defined by the lower channel 36. The stop tab 54 precludes the extender blade 36 from exiting the sun visor 10, when it contacts the stop tab 35 of the track assembly 12.

While both the extender blade 16 and the vanity assembly 14 are shown separately mounted in parallel tracks, either the extender blade 16 or the vanity assembly 14 can be mounted in a single set of tracks without the other. Thus, it is within the scope of the invention to have a visor with a sliding door for a vanity assembly, but no extender blade, or a visor with an extender blade, but no vanity assembly. For example, with reference to FIGS. 4 and 5, a visor including only an extender blade is shown. As one of skill in the art would readily recognize, it is possible to employ the same basic construction for a vanity assembly.

Figure 4:
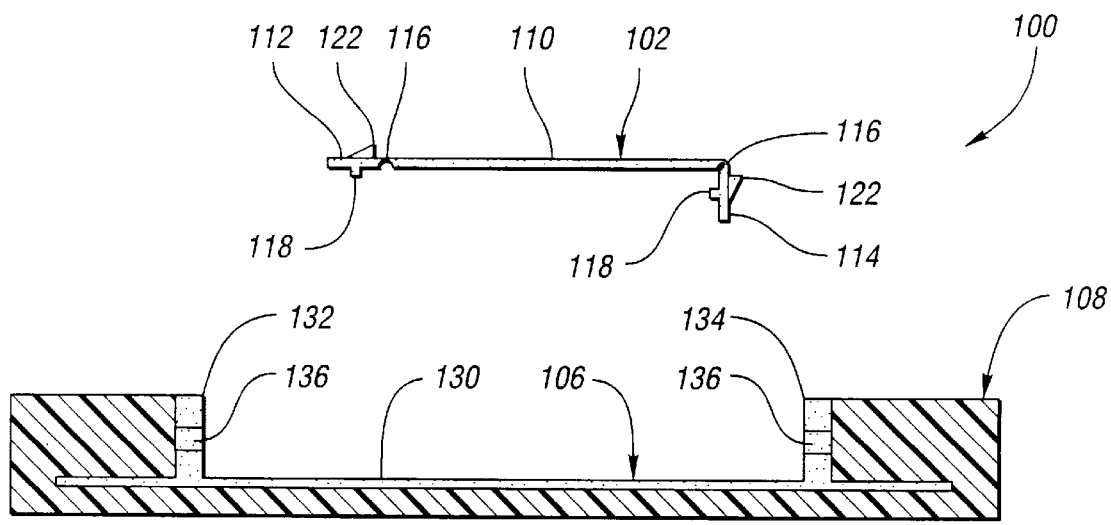
FIG. 4 is an exploded cross-sectional view of a second embodiment of a sun visor in accordance with the present invention.
Figure 5:
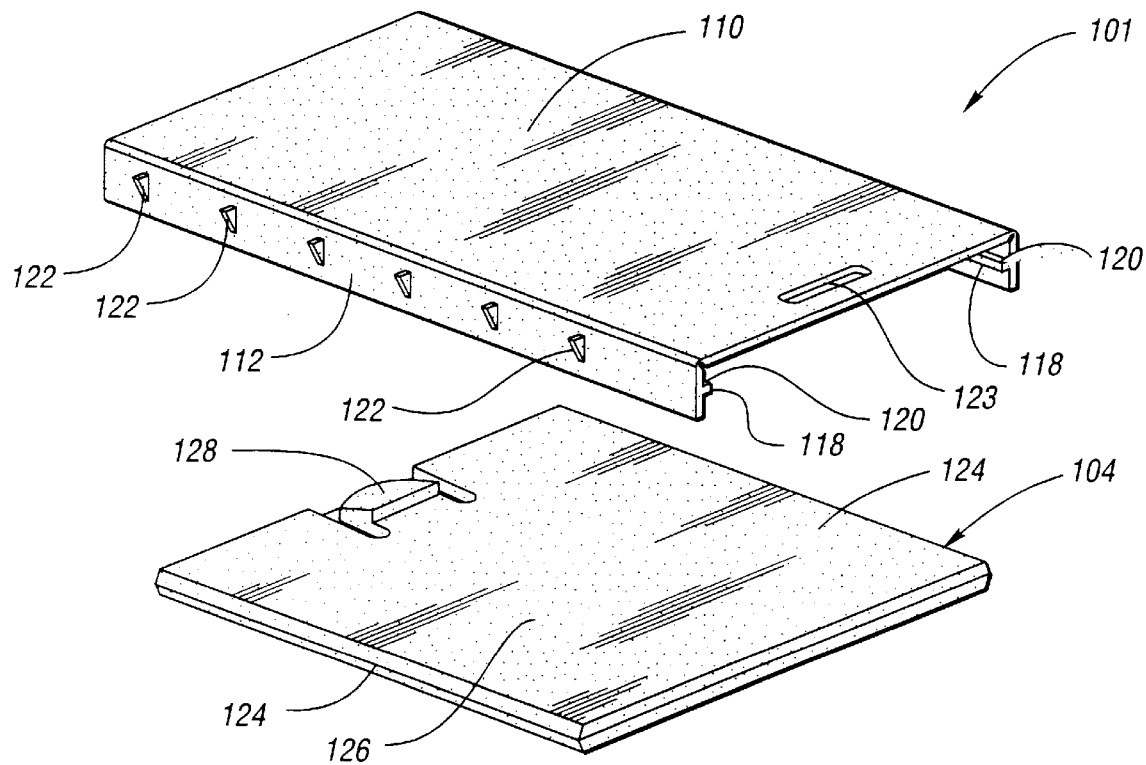
FIG. 5 is a perspective view of a track assembly and an extender blade of the sun visor of FIG. 4.

Turning now to FIGS. 4 and 5, a second embodiment of a sun visor 100 is shown as comprising a track assembly 102, an extender blade 104, a subframe 106, a main body 108. The second embodiment is similar to the first embodiment except there is no vanity assembly in the second embodiment.

The track assembly 102 is shown as partially articulated in FIG. 4 and as fully articulated in FIG. 5 and comprises a planar body 110, a first side wall 112, and a second side wall 114. Both the first and second side walls 112 and 114 extend contiguously from the planar body 110, and each are connected to the planar body 110 by living hinges 16. Upon full articulation, both the first and second side walls 112 and 114 are configured substantially parallel to one another and each extends downwardly from the planar body 110 in a substantially perpendicular orientation. The first and second side walls 112 and 114 include side wall flanges 118, which define a channel 120 when the side walls 112 and 114 are articulated. The track assembly 102 optionally includes a plurality of tabs 122 for facilitating securement of the track assembly 102 in the main body 108. The track assembly 102 includes a slot 123.

The extender blade 104 includes parallel flanges 124, and a planer body 126. A substantially wedge-shaped stop tab 128 extends upwardly from the planar body 126. The stop tab 128 can cooperate with the slot 123 of the track assembly 102 to, in turn, regulate the lateral slidability of the extender blade 104. The parallel flanges 124 have a vertically peripheral geometry greater than or equal to the vertically peripheral geometry of the remainder of the extender blade 104.

As shown in FIG. 4, the subframe 106 is securably recessed into the main body 108. Together, the subframe 106 and the main body 108 define an open-top channel for receiving the track assembly 102. The subframe 106 comprises a base 130, a first side wall 132, a second side wall 134, and a plurality of side wall slots 136. The first and second side walls 132 and 134 are configured substantially parallel to one another and each extend upwardly from the base 130 in a substantially perpendicular orientation. The first and second side walls 132 and 134 of the subframe 106 include a plurality of side wall slots 136 for controllably receiving the tabs 122 of the track assembly 102. While the subframe 106 is preferably fabricated from polymerized organic compounds, it is likewise contemplated that the subframe 106 can be fabricated from any one of a number of materials including, but by no means limited to: wood, wires and meshes of steel, aluminum and various metallic alloys, and high density corrugated paperboard. Moreover, although not shown it is contemplated that the main body 108 can completely cover the subframe 106.

The main body 108 is substantially rectangular (similar to the main body 20 as shown in FIG. 4) and is preferably fabricated from a synthetic resin such as extended polypropylene, however numerous other fabrication materials known to those having ordinary skill in the art are likewise contemplated for use. Preferably, main body 108 is molded about the subframe 106. The in-molded subframe 106 provides support and rigidity to the main body 108.

Upon assembly of the sun visor 100, the first and second side walls 112 and 114 of the track assembly 102 are rotated about their living hinges 116 and then positioned against the subframe 106 adjacent the respective side walls 132 and 134. Upon insertion, the plurality of side tabs 122 of the first and second side walls 112 and 114 are securably received into the side wall slots 136 of both the first and second side walls 132 and 134 of subframe 106.

Upon further construction of the sun visor 100, the extender blade 104 is slid into the channel 120 of the track assembly 102. Inasmuch as the parallel flanges 124 have a vertically peripheral geometry that is greater than or equal to the vertically peripheral geometry of the planar body 126, the planar body 126 does not contact the channel 120. Rather, the parallel flanges 124 contact the channel 120. The extender blade 104 can be slidably extended and/or retracted in accordance with the geometric boundaries defined by the channel 120. Furthermore, the stop tab 128 can prelude the extender blade 104 from exiting the sun visor 100, as the stop tab 128 can be inserted into the slot 123 of the track assembly 102 at a predetermined position which will prelude further extension of the extender blade 014.

Any features in the foregoing embodiments can be selectively incorporated into other embodiments. For example, sun visor 100 can accommodate a vanity assembly as discussed relative to sun visor 10. All possible derivations known to those having ordinary skill in the art with the present disclosure before them are likewise contemplated for use.

While particular embodiments of the invention have been shown, it will be understood, of course, that the invention is not limited thereto since modifications may be made by those skilled in the art, particularly in light of the foregoing teachings. Reasonable variation and modifications are possible within the scope of the foregoing disclosure of the invention without departing from the spirit of the invention.

What is claimed is:

1. A vehicle sun visor comprising:

a frame defining an open-top channel;

a track assembly mounted to the frame in the channel, the track assembly including a planar central portion and depending parallel sidewalls, each track sidewall hinged to the central portion for hinged articulation of the sidewalls relative the central portion prior to assembly within the frame, each track sidewall having at least one inwardly directed flange forming at least one track; and an extender blade mounted in the at least one track for sliding movement from a retracted position substantially within the track assembly to an extended position wherein the extender blade at least partially extends from the track assembly.

2. A vehicle sun visor according to claim 1 wherein the frame includes a pair of frame sidewalls with spaced openings and the track sidewalls have outwardly projecting tabs received in the spaced openings to retain the track assembly in the frame.

3. A vehicle sun visor according to claim 2 wherein the tabs include ramped lower surfaces to snap-fit the track assembly to the frame.

4. A vehicle sun visor according to claim 1 further comprising a living hinge between each track sidewall and the central planar portion of the track assembly.

5. A vehicle sun visor according to claim 1 wherein each track sidewall includes two of said inwardly directed flanges forming two of said tracks , and the extender blade is mounted in one of the tracks.

6. A vehicle sun visor according to claim 5 wherein the central portion includes an enlarged opening and a mirror mounted behind the opening, and further comprising a door disposed between the central portion and the mirror and slidably mounted in the other of the tracks.

7. A vehicle sun visor according to claim 1 and further comprising a molded body of expanded polypropylene, and the frame is mounted in the molded body.

8. A vehicle sun visor according to claim 7 wherein the frame is in-molded in the molded body.

9. A vehicle sun visor according to claim 1 and further comprising a stop between the extender blade and the central portion of the track assembly to limit the movement of the extender blade to the extended position.

10. A vehicle sun visor according to claim 9 wherein the stop is flexible and includes a ramped surface for insertion of the extender blade into the track assembly.

* * * * *